(12) United States Patent
DeGennaro

(10) Patent No.: US 6,394,261 B1
(45) Date of Patent: May 28, 2002

(54) VARIABLE COUNTERWEIGHTED TAKE-UP ASSEMBLY FOR ENDLESS CONVEYOR AND ENDLESS CONVEYOR SYSTEM HAVING SUCH VARIABLE COUNTERWEIGHTED TAKE-UP ASSEMBLY AND METHOD OF CONTROLLING SAME

(75) Inventor: Ronald DeGennaro, Holbrook, NY (US)

(73) Assignee: Tarpaulin.Com, Inc., Plainview, NY (US)

(*) Notice: Subject to any disclaimer, the term of this patent is extended or adjusted under 35 U.S.C. 154(b) by 0 days.

(21) Appl. No.: 09/631,337

(22) Filed: Aug. 3, 2000

(51) Int. Cl.[7] .............................................. B65G 23/44
(52) U.S. Cl. ...................................... 198/815; 198/778
(58) Field of Search ................................ 198/778, 813, 198/815

(56) References Cited

U.S. PATENT DOCUMENTS

| | | |
|---|---|---|
| 2,633,977 A | 4/1953 | McMillan |
| 2,771,178 A | 11/1956 | Holmburger |
| 3,127,854 A * | 4/1964 | Reisman ..................... 198/815 |
| 3,261,452 A | 7/1966 | Thompson |
| 3,275,126 A * | 9/1966 | Hartzell, Jr. ................ 198/815 |
| 3,500,989 A | 3/1970 | Cripe et al. |
| 3,687,274 A | 8/1972 | Clark et al. |
| 3,838,767 A | 10/1974 | Taylor |
| 4,033,451 A | 7/1977 | Kelsall |
| 4,089,407 A | 5/1978 | Bullivant |
| 4,189,047 A | 2/1980 | Beckius |
| 4,867,301 A | 9/1989 | Roinestad et al. |
| 4,901,884 A * | 2/1990 | Palmael et al. ............. 198/778 |
| 4,982,833 A | 1/1991 | Straight et al. |
| 5,501,320 A * | 3/1996 | Chipcase ................ 198/778 X |

FOREIGN PATENT DOCUMENTS

| | | |
|---|---|---|
| DE | 878 020 | 5/1953 |
| DE | 263-275 A | 12/1988 |

* cited by examiner

Primary Examiner—James R. Bidwell
(74) Attorney, Agent, or Firm—Hoffmann & Baron, LLP

(57) ABSTRACT

A variable counterweighted take-up assembly for an endless conveyor system is disclosed, wherein the endless conveyor system has a frame, an endless conveyor belt supported by the frame and is adapted to traverse a predetermined endless path. A take-up section of the conveyor system receives and stores excess portions of the conveyor belt so as to permit operational fluctuations in the length of the belt. The portion of accumulated excess belt is divided into at least two adjacent sections, a first fixed section wherein the length and weight of the belt therein is substantially constant, and a second variable section wherein the length and weight of the belt therein is permitted to vary. The first and second sections are opposed to each other in counterbalance relation in a manner to affect belt tension throughout the conveyor system. The take-up section includes an elongated flexible weighted member having at least two ends, a first end being supported by the accumulated belt portion in the second variable section, and the second end being supported by a fixed frame member spaced from the second variable section. An endless conveyor system which incorporates such variable counterweighted take-up assembly is also disclosed. A method of controlling the excess portions of conveyor belt in the second variable section is also disclosed.

32 Claims, 15 Drawing Sheets

VARIABLE COUNTERWEIGHTED TAKE-UP ASSEMBLY FOR ENDLESS CONVEYOR AND ENDLESS CONVEYOR SYSTEM HAVING SUCH VARIABLE COUNTERWEIGHTED TAKE-UP ASSEMBLY AND METHOD OF CONTROLLING SAME

BACKGROUND OF THE INVENTION

1. Field of the Invention

The present application relates to variable counterweighted take-up assembly for endless conveyors and endless conveyor system incorporating such take-up assembly. The invention also relates to endless conveyors incorporating such variable counterweighted take-up assembly. Although all types of endless conveyors are included, conveyors having a helical belt path are particularly contemplated.

2. Description of the Related Art

Endless conveyors of the type contemplated herein generally include an endless conveyor belt which has sufficient flexibility to allow the belt to traverse an endless path from a product input station to a product discharge station, and thereafter to return from one station to the other via a return section. When the conveyor path is straight, the belt must be capable of flexing along an axis generally perpendicular to the path. When the path is other than straight, such as a helical path of the type contemplated herein, the belt must be capable of flexing at least to a limited extent along at least three mutually orthogonal axes in order to permit the belt to traverse such relatively complex paths.

In order to permit such multi-directional flexing, such conveyor belts are generally constructed of a plurality of interconnected links which permit at least limited link-to-link articulation along two or more mutually orthogonal axes. In such instances, the links are generally constructed of a material such as steel making the weight of the belt a relatively significant factor in operating the conveyor system.

Conveyor belts of the type contemplated herein generally range from about 12 inches to about 60 inches in width and from about 200 feet to about 2,500 feet in length, and even up to about 3,000 feet in some instances. When a conveyor belt is constructed of numerous interlocked steel links and is between 10 and 60 inches in width and more than 200 feet in length, the weight of the belt becomes a significant factor to reconcile. For example, the belt must be driven through the work path which begins at the product input station and ends at the product discharge station. Thereafter, the belt enters the return section where it reverses direction and re-enters the product input station to continue operating in its endless path. In helical conveyors, the belt is driven up a helical shaped path in an up-go conveyor, and down a helical shaped path in a down-go conveyor. The belt is generally driven by friction forces imparted to it along the inner edge by a circular shaped rotating cage around which the belt is wrapped in the work zone, and it is provided with additional assistance by a motor driven sprocket which is constructed to engage the links of the belt directly as it is rotatably driven by the assist motor. Such motor assist is particularly needed in up-go helical conveyors where the relatively heavily weighted belt is made to traverse an up-go helical path against the force of gravity. A motor driven assist sprocket is also utilized in helical shaped down-go conveyors, although the gearing and roller arrangements differ somewhat from the up-go conveyors, and the assist force required is somewhat different. In other applications, the work zone of the conveyor path is straight.

Conveyor belts of the type contemplated herein are generally used for conveying products under various conditions. For example, in some applications, the belts are used to convey dough products through relatively high temperature atmospheres in order to assist the dough in rising prior to formation of a bread product. In other applications, the belts may be made to carry food products through relatively cold atmospheres, sometimes under freezing conditions. In still other applications, the belts may be required to conduct products at room temperature.

In each instance, the belt, being made of a plurality of interlocked metal links, will react to the surrounding conditions such as temperature, cleanliness and the like, with the result that the belt will undergo a natural stretch or compression such factors will, in turn, affect the belt tension. In some instances, the belt will become longer during operation and, in others, the belt may become shorter, and such variations in these vital parameters have necessitated the incorporation of a take-up section in the belt return section of the system in order to permit the accumulation of excess belt and to accommodate the increases and decreases in the length of the belt. Further, since the belt is constructed of numerous interconnected links, variations in the link-to-link spacing at any given time will also accumulate to change the overall length of the belt.

In helical conveyors, the belt will undergo compression along the inner edge of an arcuate turn and stretch along the outer edge, thus resulting in relatively complex changes in the overall conditions such as tension and length of the belt. These changes have also been found to affect the overall tension in the belt throughout the system, with the result that in some instances, particularly where sanitary conditions are not observed, the belt tension will differ between separate locations along the path.

It has been found that ideally, belt tension should be maintained as uniform as possible, and this objective has often been met with some success in the past by incorporating a take-up section in which excess belt is permitted to accumulate. In the take-up section, the excess belt is made to pass through two adjacent sections, a first fixed section and a second variable section. In the first fixed section, a portion of belt is maintained in the form of a vertical curtain of fixed length and weight. In the second variable section, the excess belt is looped under and about a floating dancer roller so as to assume a generally V-shaped configuration, and is permitted to increase and decrease in dependence upon increases or decreases in the length of the belt as may be caused by operating conditions. The weight of the portion of belt in the second variable section belt is maintained in counterbalance relation to the weight of the curtain of belt in the first fixed section such that when the length and weight of the belt in the second fixed section increases, the dancer arm moves to its lowermost position, and when the length and weight of the belt in the second variable section decrease, the dancer arm moves upwardly toward its uppermost portion.

In order to maintain a proper balance between the portions of belt in the first fixed and second variable sections, prior art systems have attached a fixed weight to the dancer arm in the second variable section. The weight is intended to complement the weight of the belt portion therein and to counterbalance the weight of the vertical curtain of belt in the first fixed section. It can be readily appreciated that a balanced or unbalanced condition between the two sections will in turn affect the tension on the belt in the entire endless system. Accordingly, the need to maintain a proper balance between the first and second systems is readily obvious.

Ideally, it is preferable to maintain the weight of the belt portion in the second variable section at a constant level, or at least to within a predetermined relatively narrow range substantially equal to the weight of the belt portion in the first fixed section.

U.S. Pat. No. 4,189,047 to Beckius relates to an endless conveyor wherein the tension of the belt carrying the product cannot be readily adjusted during operation. A progressive counterweight is provided for tensioning the belt where lengthening of the portion of the belt carrying the product automatically reduces the tension force and shortening the belt carrying the product automatically increases the tension force. The amount of weight varies depending upon the vertical positioning of weights and supports within a column 70. German Patent No. 263,275 relates to a conveyor belt tensioner which acts during extreme conditions. Tensioning drum 1 is connected by a tensioning cable 2 to a one-side supported load lever 5, which carries ballast 6. A force created by weights 6 varies depending upon the angle of supported load lever 5.

In present conveyor systems of the type contemplated herein, with belts of relatively small sizes, it has been possible to maintain a reasonable condition of balance between the first and second sections of the take-up section utilizing a fixed weight attached to the dancer roller arm. However, with conveyor belts increasing in width and length, a condition of balance has been more and more difficult to achieve, with the result that belt tension has also become erratic and difficult to control. With additional factors such as sanitary conditions and temperature changes also affecting the systems, prior art endless conveyor systems have been adversely affected in these respects. I have invented a variable counterweighted take-up assembly for an endless conveyor system, and an endless conveyor system having such variable counterweighted take-up assembly which avoids the disadvantages of presently known systems by providing precise control of the amount of supplemental weight added in the variable section of the take-up section of the conveyor system in accordance with specific needs at any time. I have also invented a method of controlling the weight of the belt portion in the second variable section in counterbalance to the first fixed section.

SUMMARY OF THE INVENTION

A variable counterweighted take-up assembly for an endless conveyor system is disclosed, the endless conveyor system having a frame, an endless conveyor belt supported by the frame and adapted to traverse a predetermined endless path, and a take-up section wherein excess portions of the conveyor belt are allowed to accumulate so as to permit operational fluctuations in the length of the belt. The portion of accumulated excess belt in the take-up section is divided into at least two adjacent sections, a first fixed section wherein the length and weight of the belt therein is substantially constant, and a second variable section wherein the length and weight of the belt therein is permitted to vary. The first and second sections are opposed to each other in counterbalance relation in a manner to affect belt tension throughout the conveyor system. According to the invention, the take-up section comprises an elongated flexible weighted member having at least two ends, a first end supported by the accumulated belt portion in the second variable section, and the second end supported by a fixed frame member spaced from the second variable section.

Preferably, the elongated weighted member comprises a plurality of individual weight members connected to each other in a manner to permit pivotal articulated movement relative to each other between the second variable section and the fixed frame member so as to permit flexible movement of the weighted member between the second variable section and the fixed frame member in dependence upon variations in the accumulated portion of excess belt in the second variable section. The individual weight members are preferably generally rectangular in shape, and are preferably connected to each other by at least one link chain to permit the pivotal articulated movement relative to each other. Preferably, two link chains are provided, one chain adjacent each of the shorter sides of the rectangular weight members.

The first fixed section and second variable section are preferably positioned within a return section of the conveyor belt wherein the conveyor belt returns from a product discharge station to a product input station while reversing belt direction. The portion of conveyor belt in the first fixed section is in the form of a vertical curtain of belt having an upper and a lower end, and a roller member is positioned at each end for directing the belt along its path within the section. The second variable section is comprised of excess conveyor belt which is directed beneath and around at least a portion of a floating dancer roller so as to assume a generally V-shaped elevational configuration in elevation, whereby the weight of the generally V-shaped excess conveyor belt in the second variable section is opposed in counterbalance relation to the weight of the conveyor belt in the first fixed section, and the elongated flexible weighted member is appended to the floating dancer arm to complement the weight of the excess conveyor belt in the second variable section. The floating dancer arm is permitted to move upwardly and downwardly in dependence upon the amount of excess belt in the second variable section, and the weight of the elongated flexible weighted member is permitted to transfer between the floating dancer arm and the fixed frame member in dependence upon the vertical position of the floating dancer arm as determined by the amount of excess belt in the second variable section.

A substantial portion of the weight of the elongated flexible weighted member is transferred to the floating dancer arm when the excess belt in the second variable section is at a minimum and the floating dancer arm is located at its uppermost vertical portion, and a substantial portion of the weight of the flexible weighted member is transferred to the fixed frame member when the weight of the excess belt in the second variable section is at a maximum and the floating dancer arm is located at its lowermost vertical position. The second variable section communicates with the discharge station of the conveyor belt by a plurality of roller members.

The flexible weighted member is preferably comprised of a plurality of rectangular shaped steel plates and the link chains are preferably bicycle-type link chains having at least one selected link respectively attached to each rectangular shaped steel plate to permit the pivotal articulated movement. The elongated flexible weighted member may also be an elongated unitary flexible member having weight members secured thereto to provide supplementary weight to the flexible member. Alternatively, a unitary flexible member made of a heavy metal such as lead may be provided, weight permitting.

The invention also relates to an endless conveyor system having a variable counterweighted take-up assembly, which comprises a frame, a flexible endless conveyor belt supported by the frame and adapted to traverse a predetermined endless path, a conveyor belt take-up section which permits excess portions of the conveyor belt to accumulate so as to permit operational fluctuations in the length of the belt. The accumulated belt portion is divided into at least two spaced sections, a first fixed section wherein the length and weight of the belt is substantially constant, and a second variable section wherein the length and weight of the belt therein is permitted to vary. The first and second sections are opposed to each other in counterbalance relation in a manner to affect belt tension in the endless conveyor belt. An elongated flexible weighted member has at least two ends, a first end appended to the second variable section, and a second end connected to a fixed frame member spaced from the second variable section.

The conveyor belt traverses a path having an input station and a discharge station communicating with each other by a return section, and the conveyor belt is directed from the discharge station around a plurality of roller members so as to reenter the input station in direction opposite the direction of the discharge station. The take-up section is located in the return section of the conveyor system. The elongated flexible weighted member preferably comprises a plurality of individual weight members connected to each other in a manner to permit pivotal articulated movement relative to each other between the second variable section and the fixed frame member so as to permit flexible movement of the weighted member between the second variable section and the fixed frame member in dependence upon variations in the accumulated portion of excess belt in the second variable section of the take-up section.

The second variable section is comprised of excess conveyor belt which is directed beneath and around at least a portion of a floating dancer roller so as to assume a generally V-shaped elevational configuration, such that the weight of the generally V-shaped excess conveyor belt in the second variable section is opposed in counterbalance relation to the weight of the conveyor belt in the first fixed section. The elongated flexible weighted member is preferably appended to the floating dancer arm to complement the weight of the excess conveyor belt in the second variable section. The floating dancer arm is permitted to move upwardly and downwardly in dependence upon the amount of excess belt in the second variable section, and the weight of the elongated flexible weighted member is permitted to transfer between the floating dancer arm and the fixed frame member in dependence upon the vertical position of the floating dancer arm as determined by the amount of excess belt in the second variable section. It can be seen that a substantial portion of the weight of the elongated flexible weighted member is transferred to the floating dancer arm when the excess belt in the second variable section is at a minimum and the floating dancer arm is located at its uppermost vertical position, and a substantial portion of the weight of the flexible weighted member is transferred to the fixed frame member when the weight of the excess belt in the second variable section is at a maximum and the floating dancer arm is located at its lowermost vertical position. The second variable section communicates with the discharge station of the conveyor belt by a plurality of roller members. The elongated flexible weighted member is preferably comprised of a plurality of rectangular shaped steel plates flexibly connected by one or more link chains of a bicycle-type having at least one selected link respectively attached to each rectangular shaped steel plate to permit the pivotal articulated movement.

The flexible conveyor belt preferably traverses a helical path having a product input station and a product discharge station and the return section communicates the product discharge station and the product input station with each other. The conveyor belt may be adapted to travel in an upward direction along the helical path from the product input station to the product discharge station, or alternatively, the conveyor belt may be adapted to travel in a downward direction along the helical path from the product input station to the product discharge station. Still alternatively, the conveyor belt may be adapted to travel along a straight path between the product input station and the product discharge station and the return section communicates the product discharge station with the product input station. Also, the conveyor belt may be adapted to travel in either of two directions along the straight path.

In the preferred embodiment, an endless conveyor system is disclosed having a variable counterweighted take-up assembly, which comprises a frame, a flexible endless conveyor belt supported by the frame and adapted to traverse a predetermined endless path about a rotating cage, at least a portion of the endless path being helical. A conveyor belt take-up section permits excess portions of the conveyor belt to accumulate so as to permit operational fluctuations in the length of the belt, the accumulated belt portion being divided into at least two spaced sections, a first fixed section wherein the length and weight of the belt is substantially constant, and a second variable section wherein the portion of belt therein extends under and at least partially about a floating dancer roller so as to assume a generally V-shaped configuration. The length and weight of the belt in the second variable section is permitted to vary while permitting the dancer roller to move between the lowermost and uppermost vertical positions in dependence upon the amount of excess belt in the second variable section. The first and second sections are opposed to each other in counterbalance relation in a manner to affect belt tension in the endless conveyor belt. An elongated flexible weighted member has at least two ends, a first end appended to the second variable section, the second end connected to a fixed frame member spaced from the second variable section.

A method is disclosed for controlling excess portions of conveyor belt in an endless conveyor system having a frame, an endless conveyor belt adapted to traverse a helical path about a rotating cage which provides belt driving force by frictional engagement with an inner edge of the belt, a take-up section for receiving excess portions of belt caused by operational fluctuations in the length of the belt, the take-up section being divided into at least two sections, a first fixed section wherein the length and weight of the belt portion therein is substantially fixed, and a second variable section wherein the length and weight of the belt therein is permitted to vary, the first and second sections being opposed to each other in counterbalance relation in a manner to affect belt tension throughout the conveyor system. The method comprises selectively complementing with additional weight, the weight of the portion of belt in the second variable section in a manner to maintain the combined weight therein substantially constant, or at least to within a predetermined range.

The step of complementing the weight of the portion of belt in the second variable section is accomplished by supporting one end of an elongated flexible weighted member by the portion of belt in the second variable section and supporting the other end of the elongated flexible weighted member by a fixed member spaced by a predetermined distance from the second variable section, such that when the weight of the belt portion in the second variable section increases, the amount of complementary weight supported thereby decreases, and when the weight of the belt portion in the second variable section decreases, the amount of complementary weight supported thereby increases.

BRIEF DESCRIPTION OF THE DRAWINGS

Preferred embodiments of the invention are described hereinbelow with reference to the drawings, wherein.

DETAILED DESCRIPTION OF THE INVENTION

Figure 1:
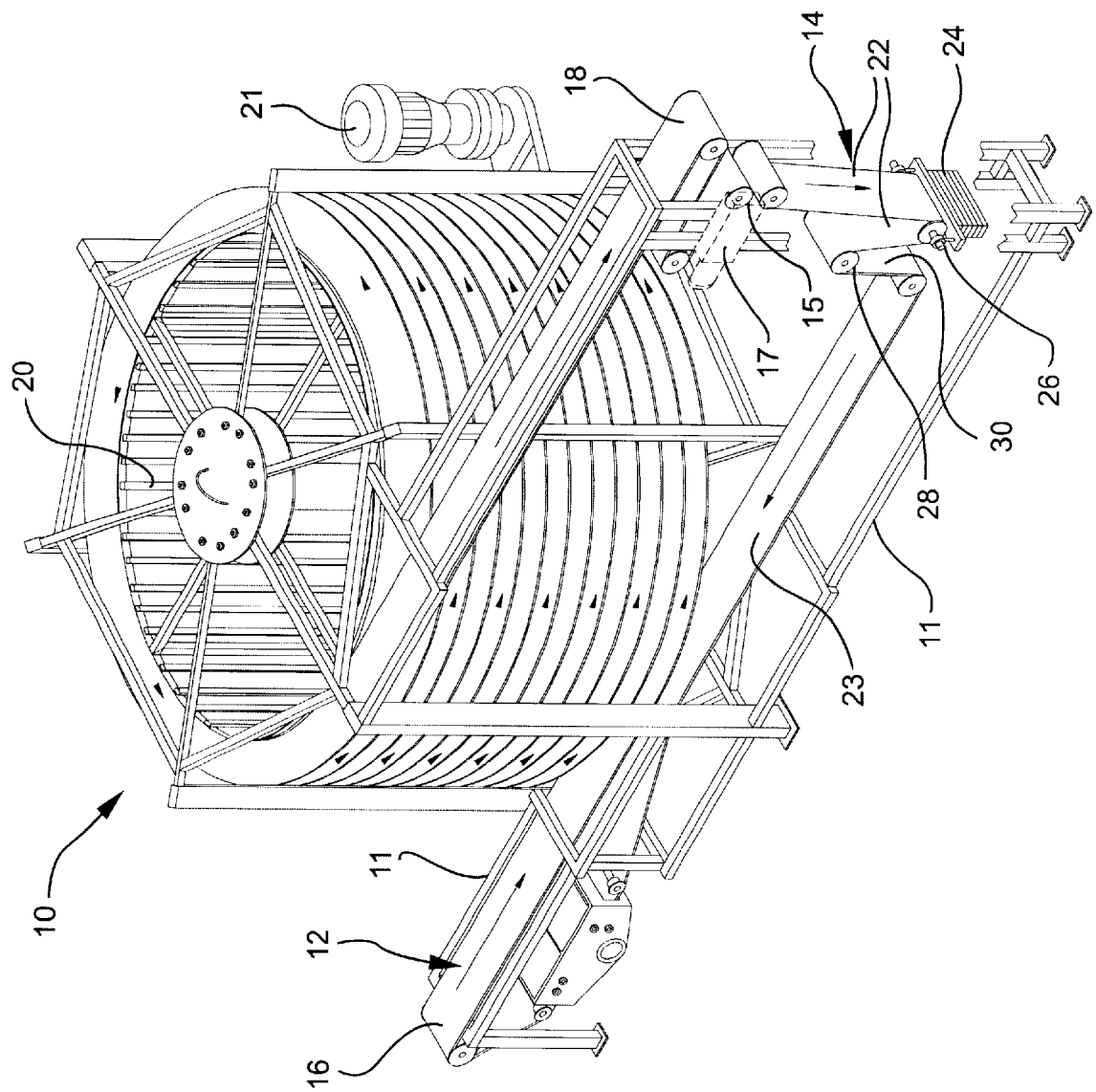
FIG. 1 is a front, right-side perspective view from above, of an up-go helical conveyor, incorporating a fixed weight counterbalance system constructed according to the prior art.

Referring initially to FIG. 1, there is illustrated a front, right side perspective view from above, of an up-go helical conveyor 10, incorporating a fixed weight counterbalance system constructed according to the prior art. The conveyor 10 is supported on frame 11 and includes flexible conveyor belt 12 having take-up section 14 in which excess belt 22 is collected in order to maintain continuity of belt movement as well as a predetermined belt tension throughout the conveyor system. The amount of excess belt 22 either lengthens or shortens in dependence upon operative conditions in the entire conveyor system as will be described in greater detail hereinbelow.

Referring again to FIG. 1, the conveyor belt 12 is flexible and is particularly constructed of interconnected links which make it capable of flexing along at least two, but preferably three mutually orthogonal directions so as to be directed along a continuously changing arcuate path to assume a helical shape as shown in FIG. 1.

The helical path begins after the "infeed" section 16 wherein products (i.e. food products such as bread, etc.) are introduced, and is followed by a discharge section 18 in which the products are discharged. One example of an endless conveyor belt construction of the type contemplated herein is described in U.S. Pat. No. 3,664,487 to Ballenger, the disclosure of which is incorporated by reference herein and made a part of this disclosure. Another example of such belt construction is disclosed in U.S. Pat. No. 4,846,339 to Roinestad, the disclosure of which is incorporated herein by reference and made a part of this disclosure. All types of belts of flexible construction as disclosed herein are contemplated.

Referring again to FIG. 1, the flexible conveyor belt 12 traverses a helical path as shown, beginning after the product infeed station 16 and terminating just prior to the product discharge station 18. Between product infeed and discharge stations 16 and 18, he belt wraps around a rotating cage 20 driven by main drive 21, which is in ontinuous frictional engagement with the inner edge of the belt in the helical portion. The frictional engagement drives the belt through its endless path, and it returns to the infeed station via return section 23 after passing through the take-up section 14.

Figure 6:
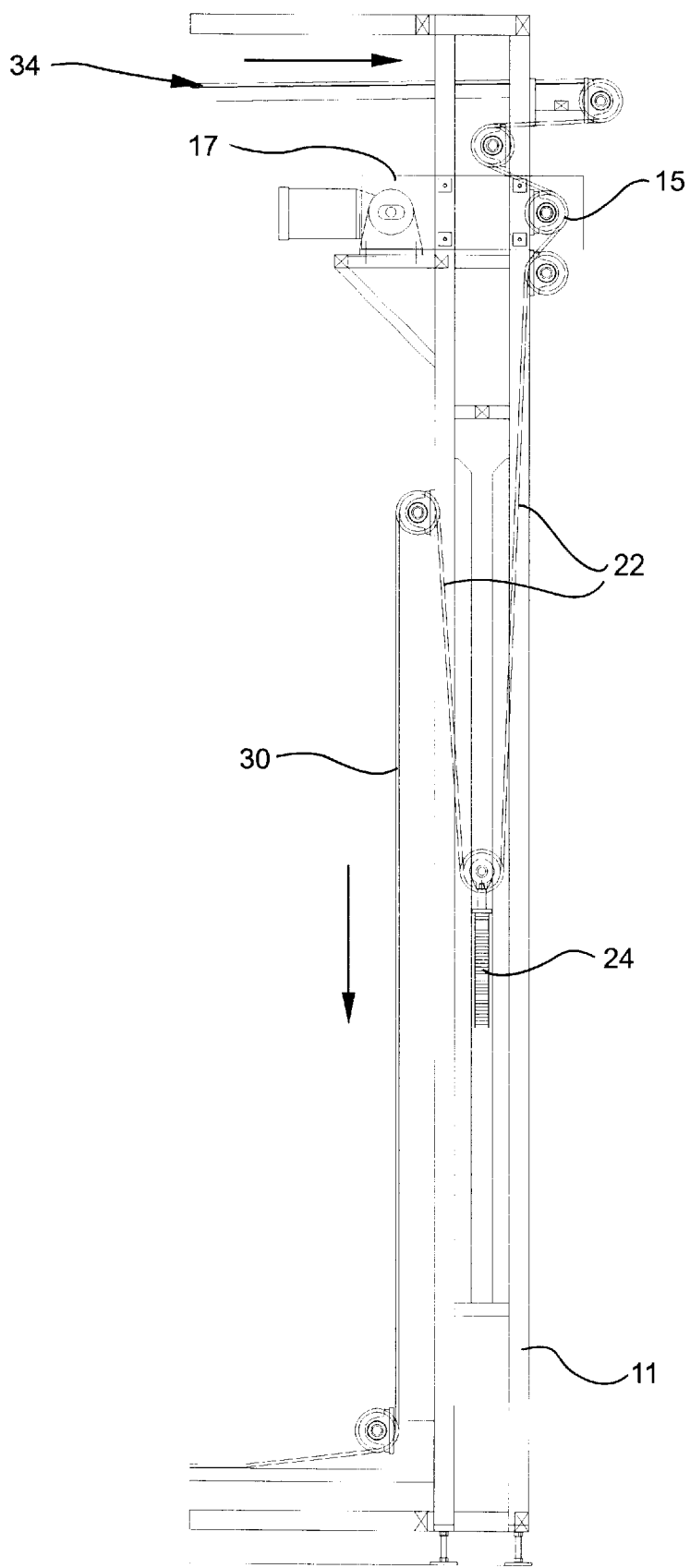
FIG. 6 is a front elevational view of the fixed weight counterbalance system shown in the take-up section of the up-go conveyor of FIG. 1, illustrating the condition of the conveyor belt having an average amount of excessive belt in the take-up section.

The belt is generally of relatively substantial weight due to the intricate metal link construction. Accordingly, a sprocket 15 driven by motor 17 is incorporated into the take-up section to provide assistance to the belt to move along its helical path. The sprocket 15 and drive motor 17 are shown schematically in FIG. 1, FIGS. 6 and 7. It can be seen that by directing the flexible conveyor belt through the helically shaped path, products are made to travel through significantly large distances, in a relatively limited space.

As noted, as the belt leaves the rotating cage and enters the take-up section 14, a sprocket 15 driven by motor 17 applies a driving force to the belt to assist its movement along the helical path and to provide assistance in maintaining the belt under tension within a predetermined range. By maintaining the tensile force on the belt to within a predetermined range, the friction force between the rotating cage 20 and the belt 12 is also regulated. Regulation of belt tension is particularly significant, since excess belt tension will cause the cage-to-belt friction force to be higher and excessively low belt tension will cause the cage-to-belt friction force to be reduced excessively so as to adversely affect the belt drive force.

In practice, the rotational speed of the outer surface of the rotating cage is controlled to exceed the corresponding rotational speed of the inner edge 11 of the belt 12 such that a relatively precisely controlled slippage occurs between the cage 20 and the belt 12, thereby acting in concert with the drive motor 17 and driven sprocket 15 to maintain the belt tension to within the predetermined range. However, it has been determined that factors such as temperature, cleanliness, natural belt stretch or the like often affect the belt and cause it to either become longer or shorter due particularly to the fact that it is constructed of numerous interconnected metallic links. Thus, cumulative effects of link spacing and the like serve to cause this lengthening or shortening of the belt. In such case, the operative parameters of the belt, such as tension, cage friction, etc., are also affected, thereby potentially impairing the conveyor operation. For example, when the belt undergoes excessive stretch, there is an excessive amount of accumulated excess belt 22 in the variable section of take-up section 14, with the result that the excessive weight of the belt in the take-up section applies excessive force to the remainder of the belt through the belt return section 23. Similarly, when the belt undergoes excessive shortening by temperature conditions, sanitary considerations or the like, the weight of the excess belt 22 in the variable section of take-up section 14 is reduced and must be complemented by an additional weight. However, if the belt becomes shorter to an extent where it is subjected to excessive tension forces, such tension is applied to the entire belt via the belt return section 23.

In present day conveyors, as shown in FIG. 1, a fixed weight 24 is appended from the excess belt 22 in the take-up section 14 in order to control the weight of the portion 22 of the conveyor belt in the variable section of take-up section 14 which does not carry products. In particular, the portion of excess belt 22 in the variable section of take-up section 14 passes under a floating dancer arm 26 to form a V-shaped configuration, and thereafter it extends around roller 28 to form a vertical curtain 30 of conveyor belt. The vertical curtain 30 and the V-shaped section 22 are best characterized respectively as fixed and variable sections of the take-up section and are operative to counteract each other such that the weight of the V-shaped section 22, which varies in dependence upon the amount of excess belt in the system, counteracts the weight of the vertical curtain 30. Accordingly, as the variable V-shaped section 22 increases in length due to an increase in the overall belt length, it increases correspondingly in weight, and thereby applies greater tensile force to the opposing vertical curtain 30. Similarly, when the excess amount of belt reduces in length, the vertical length of the V-shaped section 22 also becomes shorter and reduces in weight so as to apply less counterbalance force to the vertical curtain 30.

As noted hereinabove, in order to provide assistance in controlling the tension on the vertical curtain 30 in existing conveyors, as well as on the entire belt in the endless conveyor, a fixed weight 24 is appended to the V-shaped section 22, as shown in FIG. 1. The combined weight of the V-shaped section 22 and the fixed weight 24 act in concert to counterbalance the weight of the vertical curtain 30.

While the use of a fixed weight 24 has been somewhat successful in the past to maintain the tension on the conveyor belt to within a predetermined range, as conveyors have become larger in both length and width, conveyor belts have become correspondingly larger and the belts have become significantly greater in weight. Accordingly, the weight of the excess belt 22 in the take-up section has increased, and it has become increasingly difficult to maintain the correct amount of tension on the conveyor belt using the fixed weight 24 in the take-up section as shown in FIG. 1. Accordingly, the present invention as shown in FIG. 2 has been developed to overcome these disadvantages and to provide a precisely regulated system of weight control in the take-up section.

Figure 2:
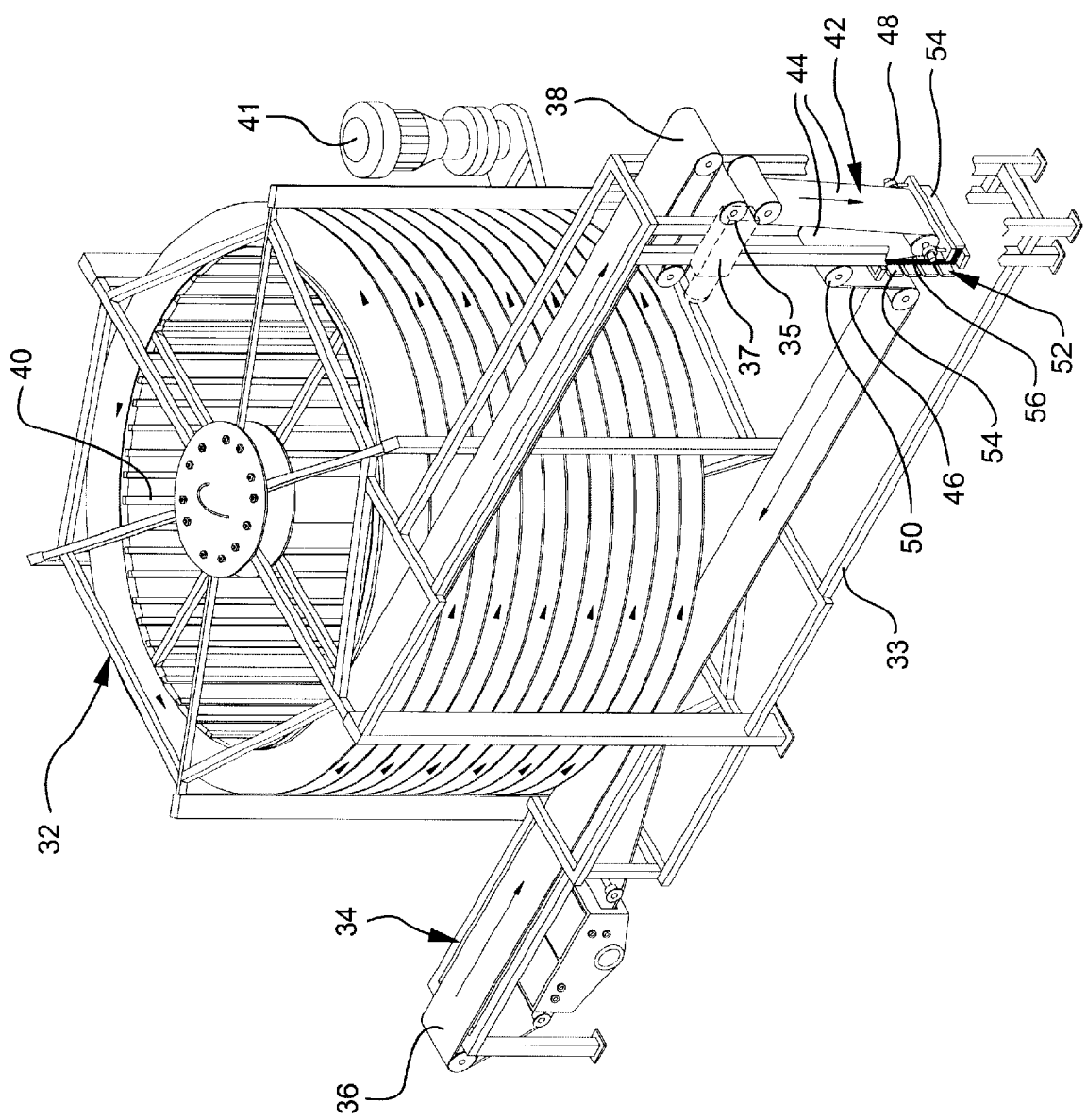
FIG. 2 is a front, right-side perspective view from above, similar to FIG. 1, of a helical conveyor, incorporating a variable weight counterbalance system constructed according to the present invention.

Referring now to FIG. 2, there is illustrated an up-go conveyor 32 which incorporates a variable weight counterbalance system in the take-up section in accordance with the present invention. With the exception of the variable weight counterbalance system which will be described hereinbelow, the conveyor 32 is supported on frame 33 and is the same as the conveyor 10 disclosed in FIG. 1. In FIG. 2, conveyor 32 is supported on frame 33 and includes conveyor belt 34 which traverses a helical path as shown, beginning at a point following the product infeed station 36 and terminating just prior to the product discharge station 38. Between product infeed station 36 and product discharge station 38, the belt wraps around rotating cage 40 driven by main drive 41, and is caused to traverse a helical path by frictional engagement between the cage 40 and the belt 34 in a manner similar to that disclosed in connection with the conveyor shown in FIG. 1. Motor 37 drives sprocket 35 which engages the belt as shown to assist the movement of the belt along the endless path.

As shown in the conveyor 10 of FIG. 1, conveyor 32 in FIG. 2 includes a take-up section 42 in which excess belt accumulates in the form of V-shaped section 44 of the variable section, which provides counterbalance to vertical curtain 46 of the fixed section of take-up section 42, with floating dancer arm 48 and roller 50 operative in the same manner as described for floating dancer arm 26 and roller 28 in FIG. 1, respectively.

Referring again to FIG. 2, the V-shaped section 44 of belt 34 in the take-up section is attached to a dancer arm 48 located at the lowermost end of the V-shaped section 44. The variable weight 52 is comprised of a plurality of individual generally rectangular-shaped weights 54, connected by bicycle-type link chain 56, shown more clearly in FIGS. 3 and 4. Link chains 56 are attached to plates 54 as shown, by bolts or screws 58 to permit the individual plates 54 to articulate with respect to each other as permitted by individual pivotal motion of links of chain 56. One link chain 56 equidistant from the opposite end of plates 54 is not shown, but is behind the portion of belt 44.

Figure 3:
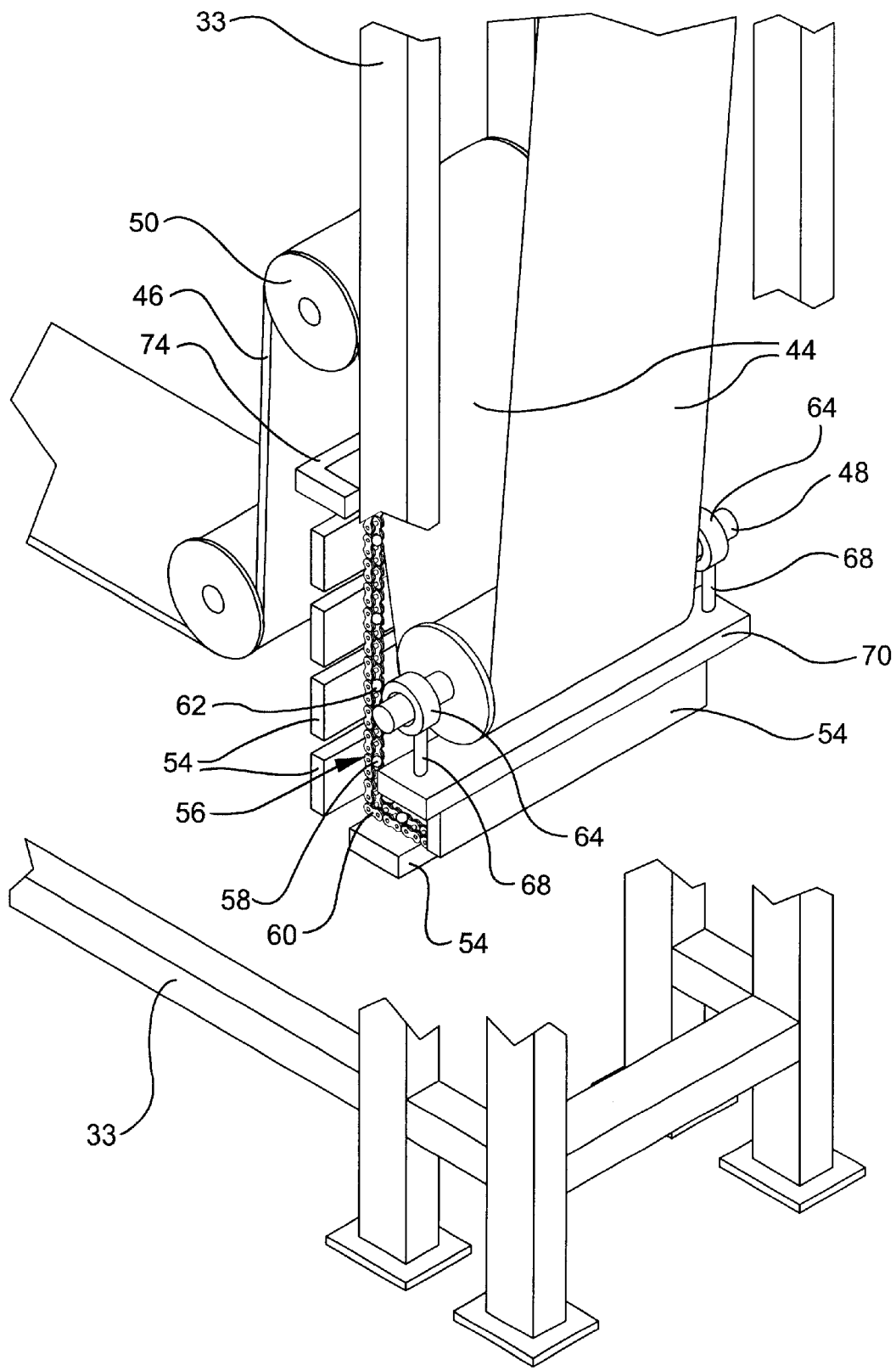
FIG. 3 is a right-side perspective view of the variable weight counterbalance system of the conveyor shown in FIG. 2, greatly enlarged for illustration purposes and shown in relation to the conveyor frame.
Figure 4:
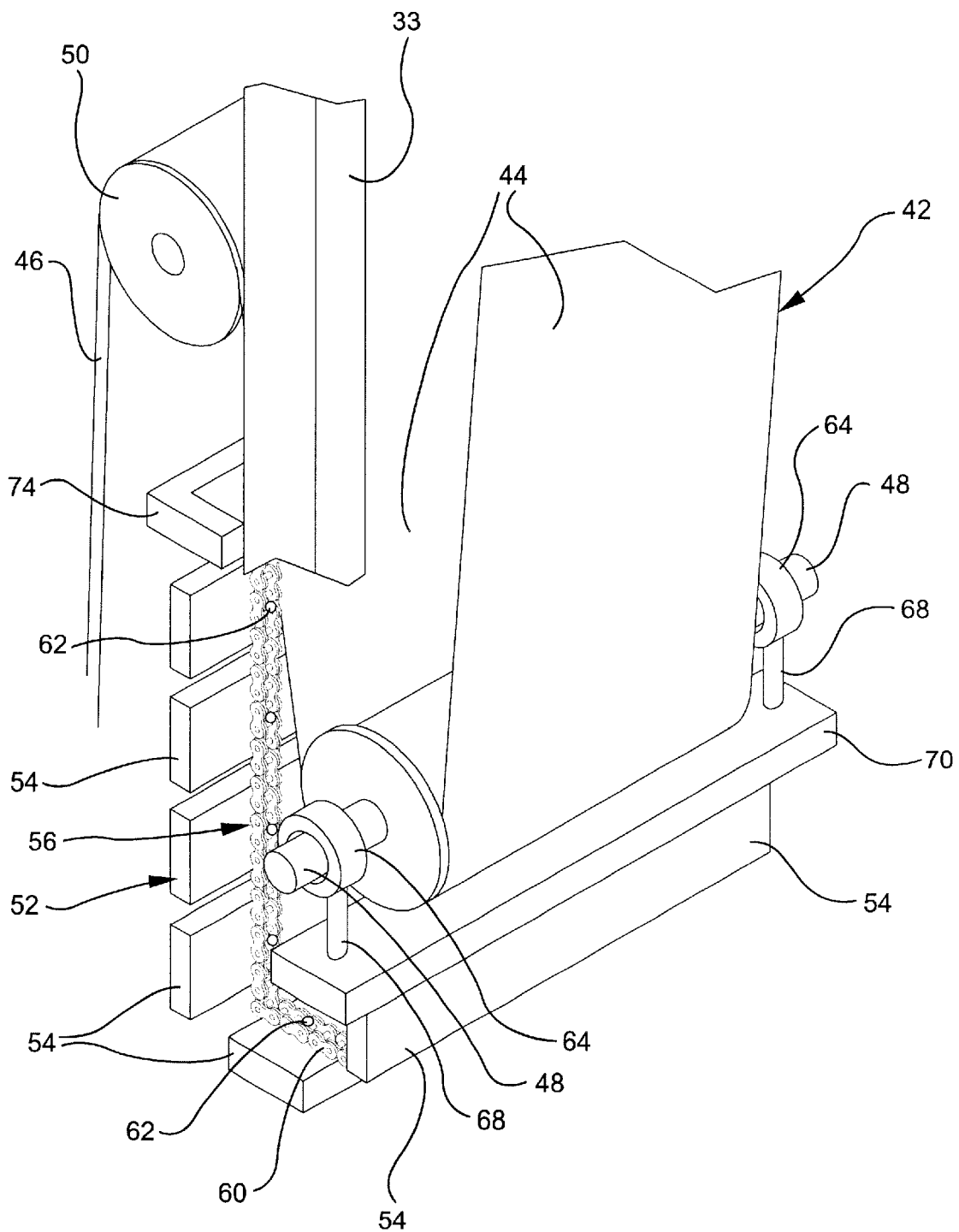
FIG. 4 is a right-side perspective view, greatly enlarged, of the variable weight counterbalance system shown in FIG. 3.
Figure 5:
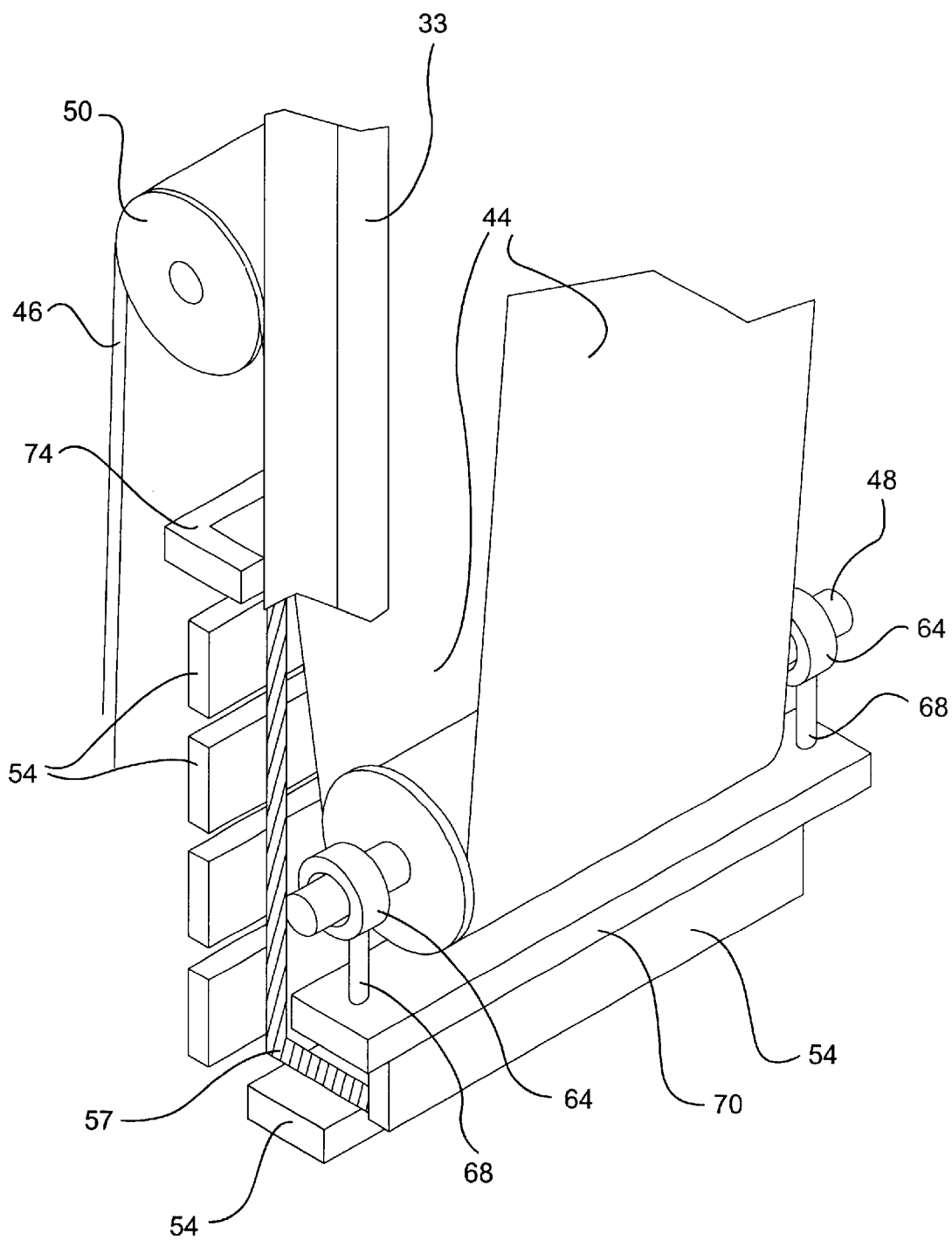
FIG. 5 is a right-side perspective view, greatly enlarged, of a variable weight counterbalance system for a conveyor similar to the system shown in FIG. 4, incorporating an alternative type of connecting device for the individual plate-like weight members of the variable weight counterbalance system.

Referring now to FIG. 4, there is illustrated a perspective view of the variable weight counterbalance system 52 shown in FIG. 3, but in greater and enlarged detail. The individual plates 54 of the variable weight 52 are shown in greater detail in FIG. 4, and the individual links 60 of bicycle-type link chain 56 are also shown in greater detail. As can be seen, the links 60 are selectively and individually attached to the plates by bolts or screws 62. Floating dancer arm 48 is mounted for rotation via bearings 64 which are separated by rigid rods 68 connected to support plate 70. Alternative devices to flexibly connect weights 52 may be utilized as illustrated generally in FIG. 5, wherein weights 54 are connected to each other by a flexible strap or other similar device 57. Additionally, a flexible unitary weighted strap may be utilized, where possible, to control the weights required.

Referring again to FIGS. 3 and 4, support plate 70 has connected thereto the variable counterbalance weight 52 via link chain 56. The lower end of the variable 25 counterbalance weight 52 is connected by link chain 56 to support plate 70 as shown, whereas the upper end of variable counterbalance weight 52 is connected to a fixed support 74 connected to frame 33, as shown in FIG. 4 and as best seen in FIGS. 8, 9 and 10.

The operation of counterbalance weight 52 is best described in connection with FIGS. 8, 9 and 10 which illustrate the counterbalance system of the take-up section 42 of an up-go conveyor as shown in FIGS. 2, 3 and 4. Referring to these Figs., FIG. 8 illustrates fixed section 46 and variable section 44 of the take-up section 42 of up-go conveyor 32 shown in FIG. 2, showing the counterbalance weight 52 of the variable section constructed according to the present invention. FIG. 8 illustrates the condition wherein the conveyor belt has substantially a minimum amount of excess belt in the take-up section. FIG. 9 illustrates take-up section 42 of the up-go conveyor 32 as shown wherein the conveyor belt has an average amount of excess belt in the take-up section. Finally, FIG. 10 illustrates the take-up section 42 of the up-go conveyor 32 wherein the conveyor belt has substantially the maximum amount of excess belt in the take-up section.

Figure 8:
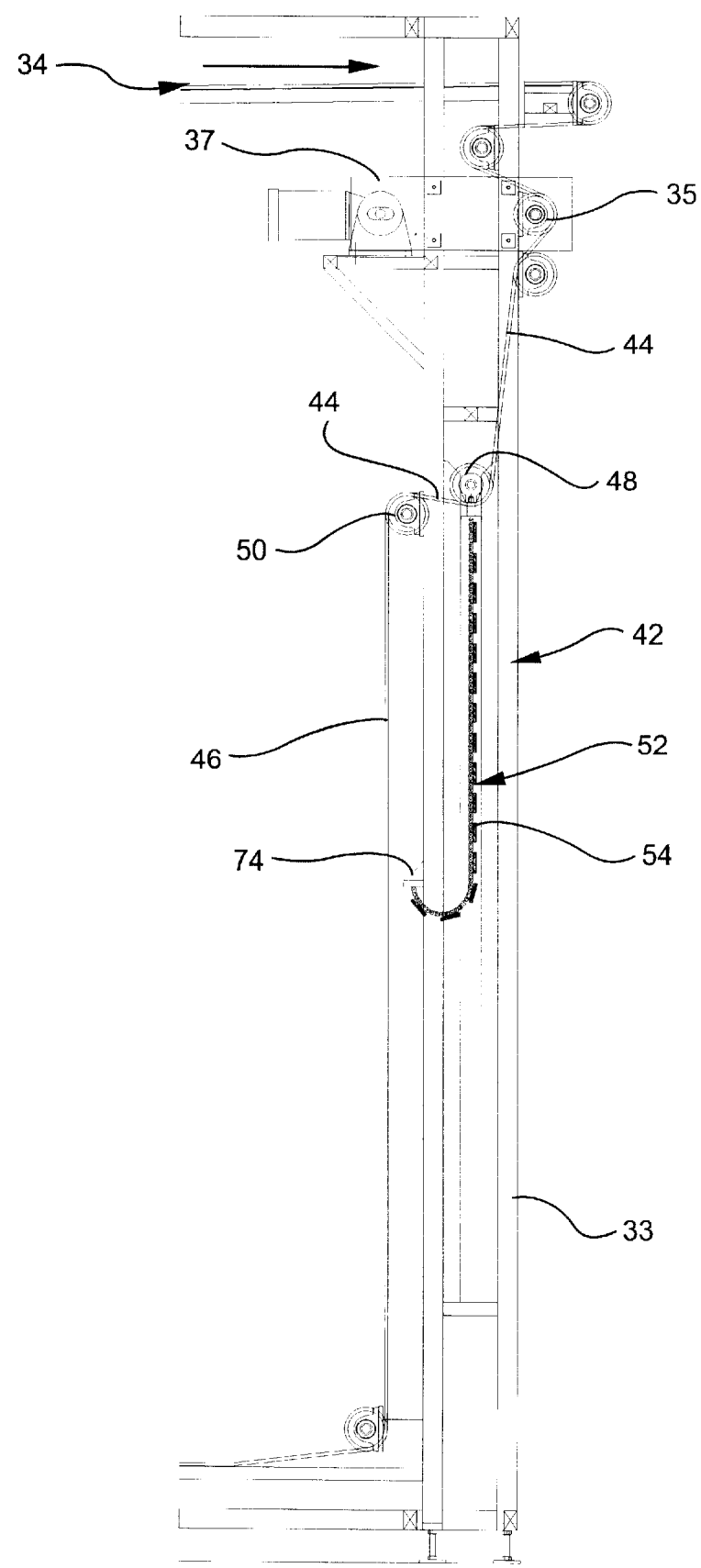
FIG. 8 is a front elevational view of the variable weight counterbalance system of the take-up section of an up-go conveyor shown in FIG. 2, illustrating the condition of the conveyor belt having substantially a minimum amount of excess belt in the take-up section.

As can be seen from FIG. 8, when a minimum amount of excess belt 44 is accumulated in the take-up section, the vertical dimension of excess belt 44 is lessened causing dancer arm 48 to be raised to the highest vertical level shown. Counterbalance weight 52 actually shifts toward the floating dancer arm 48 and increases the portion of weight 52 carried by the dancer arm 48, while simultaneously reducing the portion of weight 52 carried by the fixed support 74. Accordingly, it can be seen that the arrangement of the variable counterbalance weight 52 actually complements the movements of the excess belt 44 in the take-up section 42 by increasing the portion of weight 52 carried by dancer arm 48 and excess belt 44 when excess belt 44 is lesser in weight as shown in FIG. 8.

Figure 9:
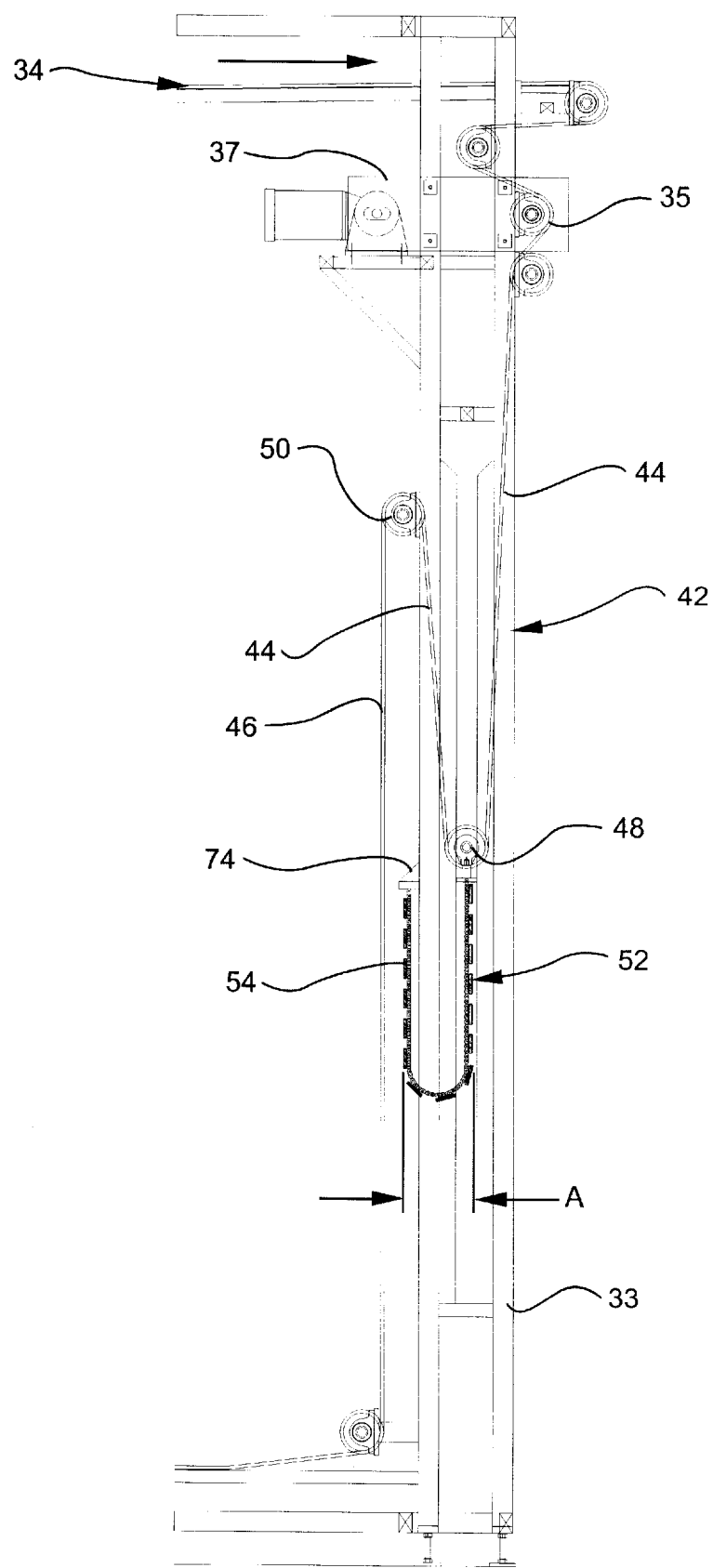
FIG. 9 is a front elevational view of the conveyor belt and variable weight counterbalance system of the take-up section of an up-go conveyor as shown in FIG. 8, illustrating the condition of the conveyor belt having an average amount of excess belt in the take-up section.
Figure 10:
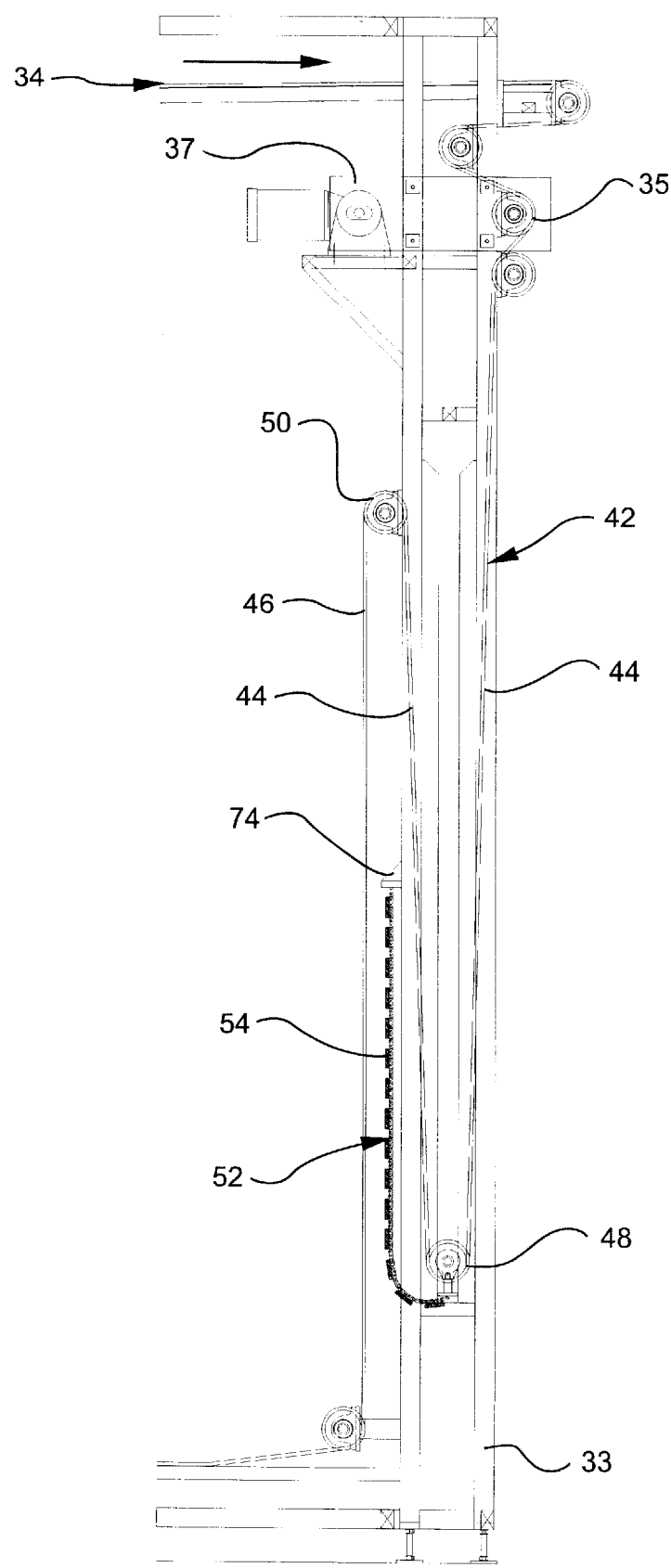
FIG. 10 is a front elevational view of the conveyor belt and variable weight counterbalance system of the take-up section of an up-go conveyor as shown in FIG. 9, illustrating the condition of the conveyor belt having substantially a maximum amount of excess belt in the take-up section.

Referring now to FIG. 9, there is illustrated the take-up section of the conveyor wherein the excess belt in the take-up section is of average length. By average length is meant that it is approximately intermediate the minimum length of excess belt 44 shown in FIG. 8 and the maximum length of excess belt 44 shown in FIG. 10. It is apparent from FIG. 9 that the variable weight 52 is divided substantially equally between fixed frame member 74 and floating dancer arm 48, except that in FIG. 9 the excess belt forms a V-shaped configuration prior to passing over roller 50 to form vertical curtain 46, which counterbalances the weight of excess belt 44.

Referring now to FIG. 10, there is illustrated the take-up section of the up-go conveyor wherein the excess conveyor belt 44 in the take-up section is substantially a maximum length. In this instance, since the length of the excess conveyor belt 44 is greater, the weight of the excess belt 44 forming the V-shaped section in the take-up section will be corresponding greater, causing the dancer arm 48 to be lowered to its lowermost position as shown, and thereby causing the individual weights 54 of variable counterbalance weight 52 to shift towards the fixed support 74 such that most of the weight is carried by the fixed support 74 and a substantially minor amount of the weight 52 is carried by the V-shaped section of excess belt 44 in the take-up section.

In summary, the operation of the variable counterbalance weight shown in FIGS. 8, 9 and 10 will be readily apparent to persons skilled in the art. When the weight of the excess belt 44 shown in FIG. 8 is at a minimum, a maximum portion of the variable counterbalance weight is operative to assist in maintaining a predetermined tension on the conveyor belt throughout the entire conveyor system. When the weight of the excess conveyor belt 44 in the take-up section 42 is at a maximum as shown in FIG. 10, a minimum portion of the variable counterbalance weight 52 is added to the weight of the excess belt 44, thereby permitting substantially the entire weight of the excess belt in the take-up section to counterbalance the first fixed section and thereby control the tension on the conveyor belt in the entire system. Lastly, as seen in FIG. 9, when the length of the excess conveyor belt 44 in the take-up section 42 is an average amount, the portion of the variable counterbalance weight 52 is at a proportionately corresponding medial amount and therefore will complement the weight of the excess belt in the take-up section up to a predetermined medial amount. It is preferable to maintain the weight of the portion of belt in the second variable section constant, or at least within a predetermined narrow range, approximately equal to the weight of the curtain of belt in the first section.

It can be appreciated that the individual material and dimensions of the individual weights 54 which form the counterbalance weight 52 can be precisely calculated and defined to provide a relatively constant downward force in the take-up section by determining the weight of each individual segment 54 so as to properly complement the weight of the excess belt 44 in the take-up section. By providing the appropriate predetermined dimensions and weight of each segment, and by determining the optimum distance "A" between dancer arm 48 and fixed frame member 74, as shown for example in FIGS. 9 and 11, the variable counterbalance weight can be constructed to provide a substantially constant downward force on the entire conveyor belt system through the take-up section. This constant downward force is predetermined and substantially accurate and contrasts significantly with the relatively unpredictable downward force which is provided on the conveyor belt in the up-go conveyor shown in FIGS. 1, 6 and 7 wherein only one fixed weight 24 was incorporated to complement the weight of the V-shaped section of excess belt in the take-up section. Further, it can be envisioned that the variable counterweight 52 can be made longer or shorter, depending upon individual needs in each conveyor, and upon the actual predetermined tension force required.

Finally, it is envisioned that the weight 52 can also be constructed as a continuous flexible weighted material which would provide even more precision in complementing the weight of the excess belt in the take-up section. For example, a flexible material such as plastic or rubber can be provided with a dense heavy material, such as lead pellets embedded therein to provide a precise and continuous shifting of weight between the fixed support and the excess belt in the take-up system. As noted above, alternatively the flexible material can be a continuous heavy metal such as lead where permitted by the weight requirements.

Figure 7:
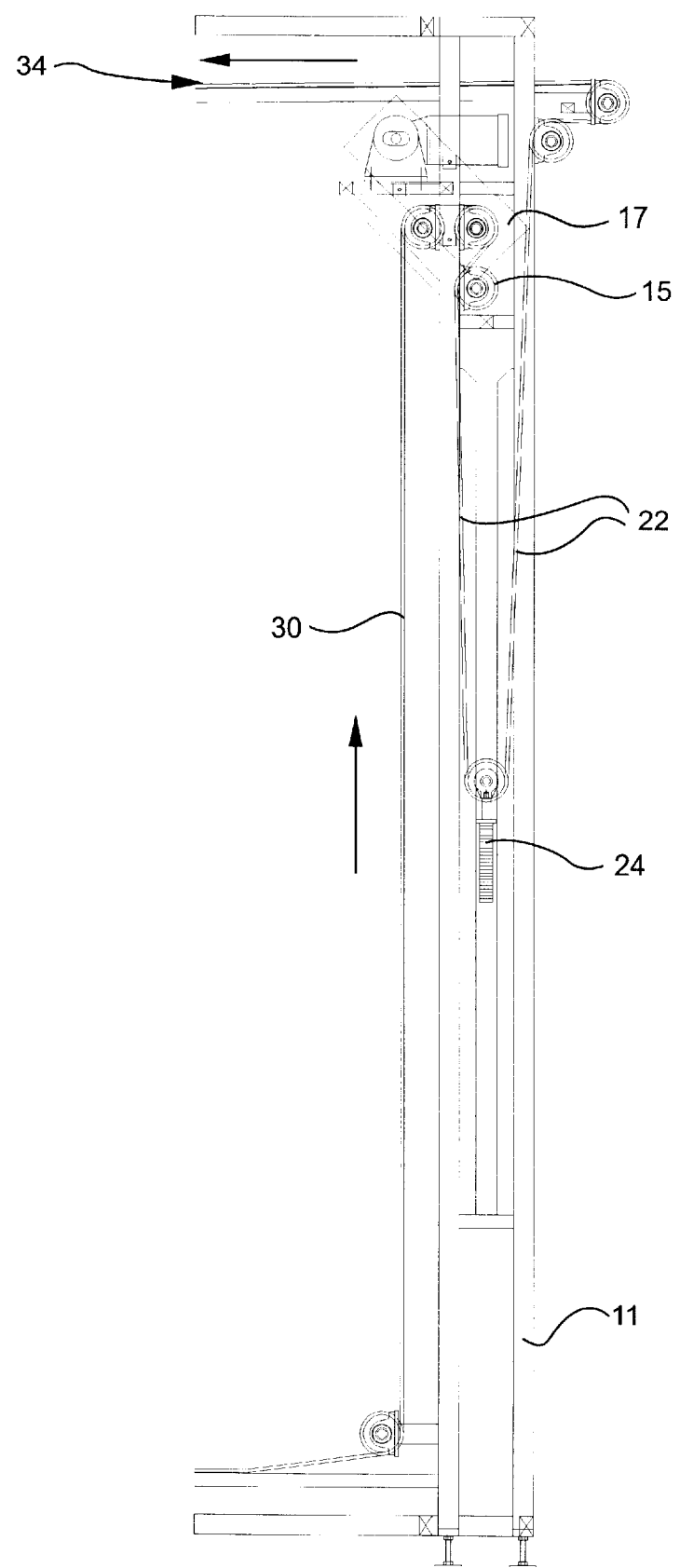
FIG. 7 is a front elevational view of the fixed weight counterbalance system of the take-up section of a down-go conveyor similar to the up-go conveyor of FIG. 6, illustrating the condition of the conveyor belt having an average amount of excess belt in the take-up section.

Referring now to FIG. 7, there is illustrated the take-up section of a down-go conveyor constructed according to the prior art wherein a fixed weight 24 is incorporated to complement the weight of the generally V-shaped excess belt in the take-up section. As can be seen from FIG. 7, the down-go conveyor is similar to the up-go conveyor shown in FIG. 2, with the exception that in the helical portion of the belt path, the belt travels in the downward direction and the roller arrangement for reversing the direction of the conveyor belt is distinct from the roller arrangement in FIGS. 2 and 6.

Figure 11:
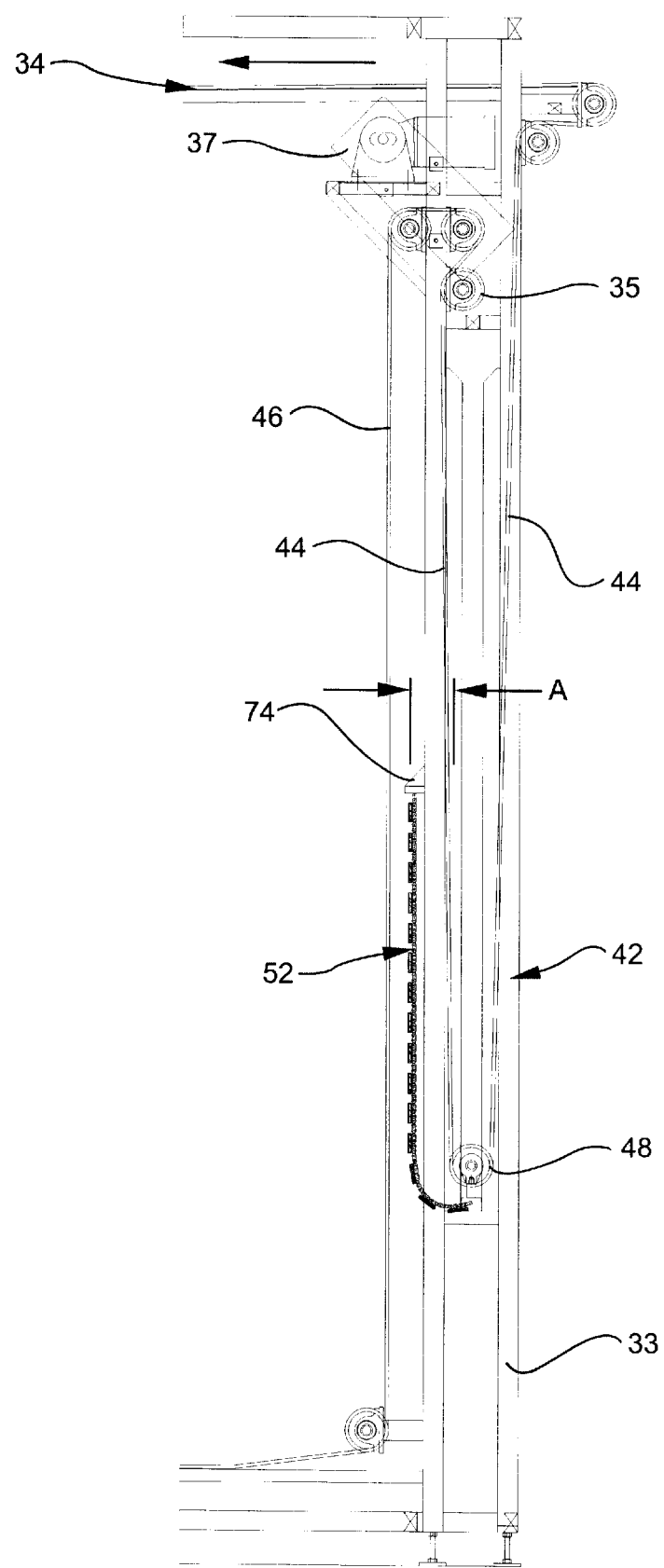
FIG. 11 is a front elevational view of the variable weight counterbalance system of the take-up section of a down-go conveyor, illustrating the condition of the conveyor belt having substantially a maximum amount of excess belt in the take-up section.
Figure 12:
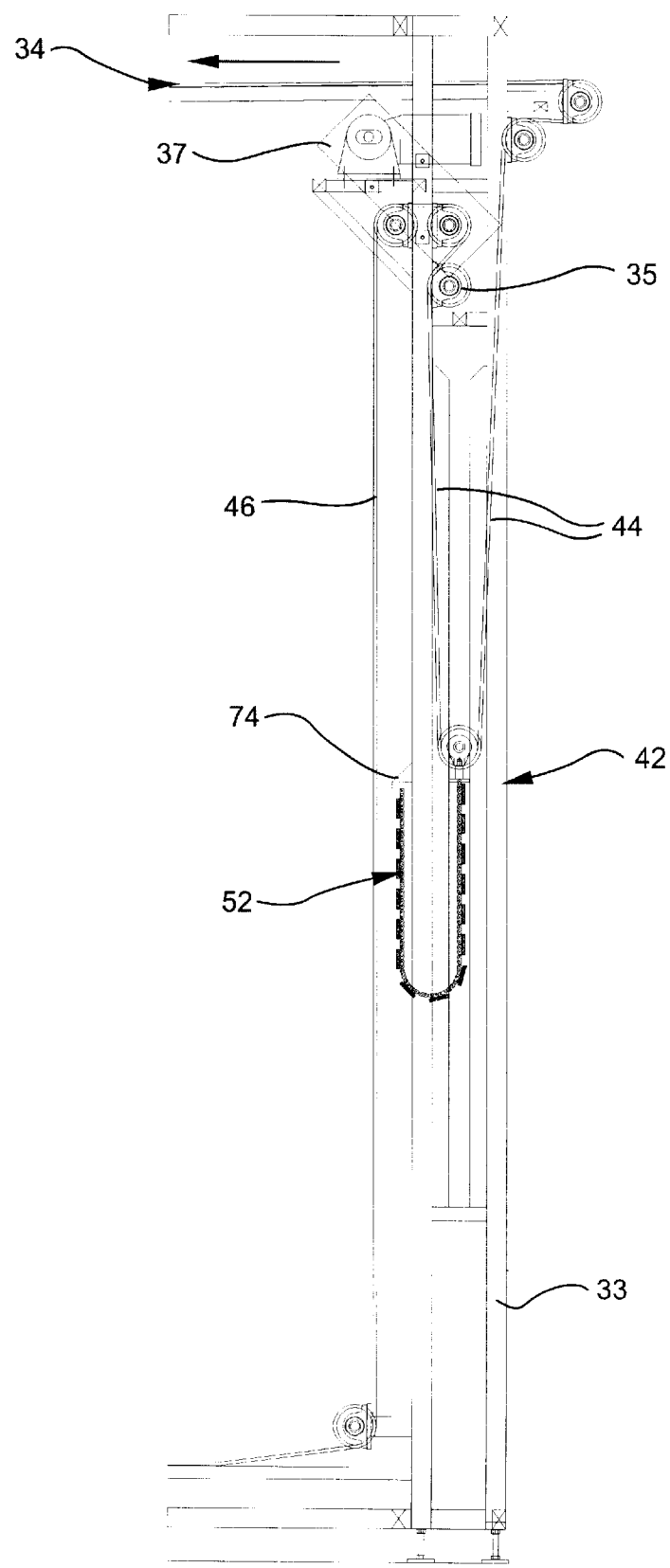
FIG. 12 is a front elevational view of the conveyor belt and variable weight counterbalance system of the take-up section of a down-go conveyor as shown in FIG. 11, illustrating the condition of the conveyor belt having an average amount of excess belt in the take-up section.
Figure 13:
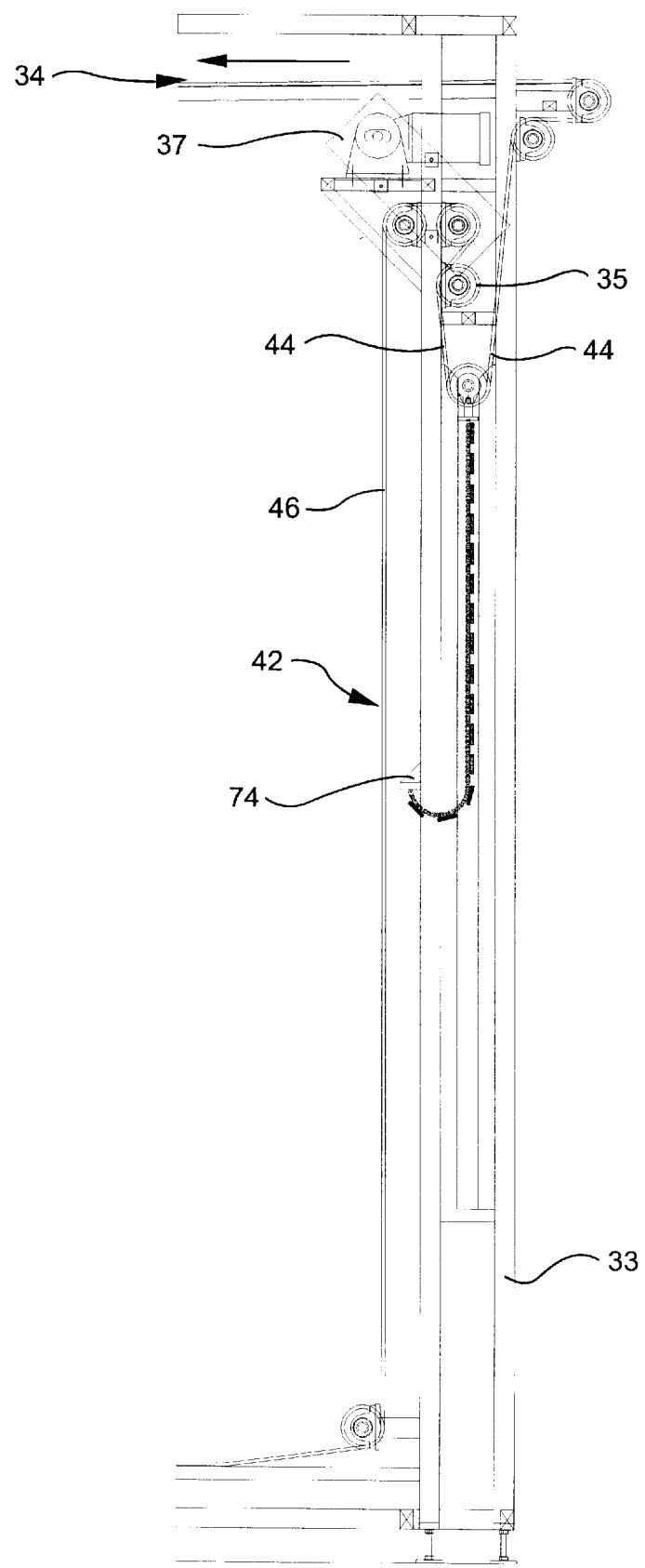
FIG. 13 is a front elevational view of the conveyor belt and variable weight counterbalance system of the take-up section of a down-go conveyor as shown in FIG. 12, illustrating the condition of the conveyor belt having substantially a minimum amount of excess belt in the take-up section.

Referring now to FIGS. 11, 12 and 13, there is illustrated the take-up section of a down-go conveyor which incorporates the variable counterbalance weight system constructed according to the present invention. The operation of the down-go conveyor is similar to the up-go conveyor described in connection with FIGS. 2–4 and 8–10. However, in the down-go conveyor, the conveyor belt traverses a helical path in the downward direction, opposite the direction shown in FIG. 2. Accordingly, the location of the product infeed station in the up-go conveyor becomes the product discharge station in the down-go conveyor and the location of the product discharge station in the up-go conveyor becomes the product infeed station in the down-go conveyor.

The down-go conveyor is driven by the rotating cage as disclosed in the up-go conveyor. Also, a sprocket 35 is positioned in engagement with the links of the belt and is driven by motor 37 to assist the movement of the belt along its path. A typical arrangement of the motor 37 and direction reversing rollers for a down-go conveyor is shown in FIGS. 11–13.

Figure 14:
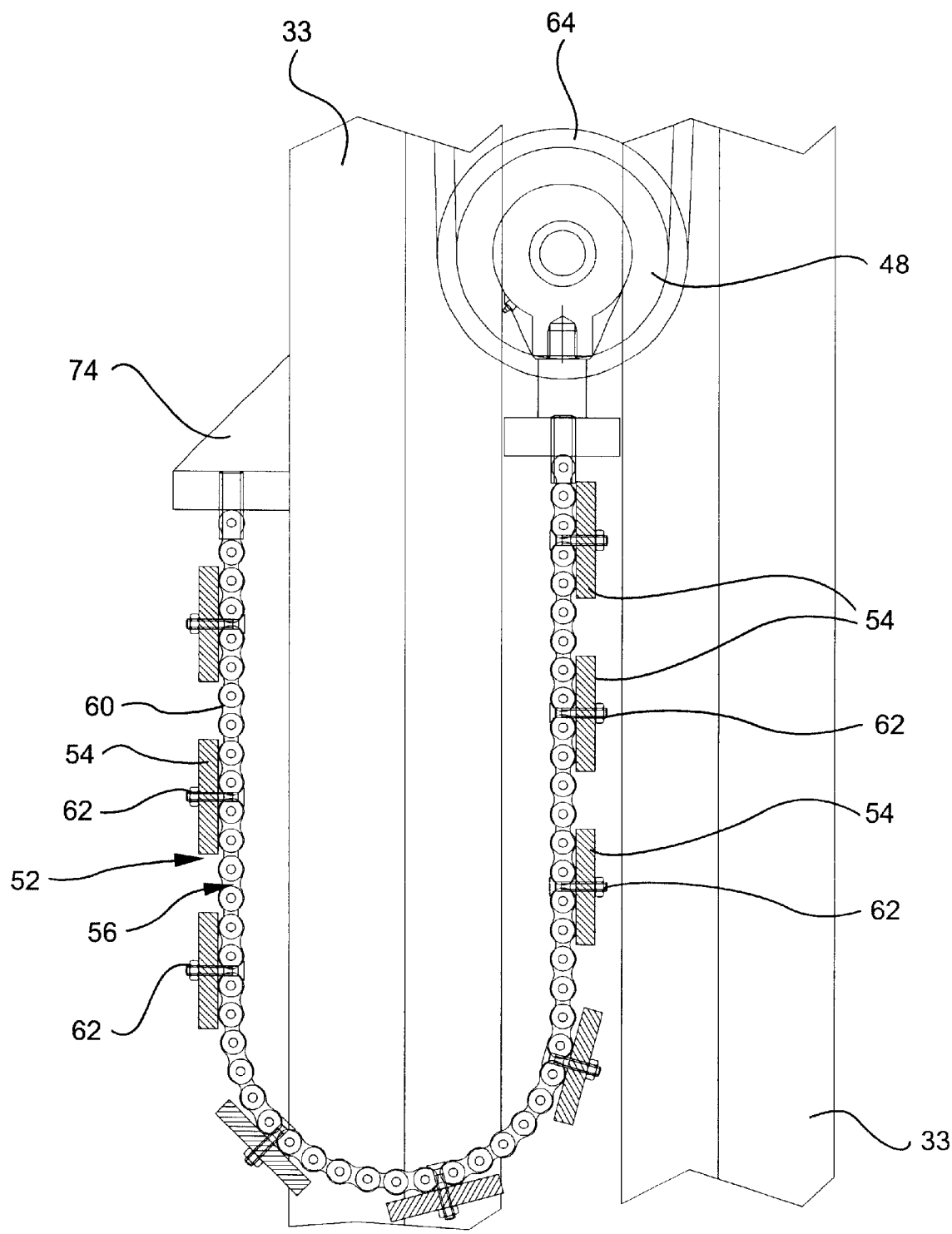
FIG. 14 is a partial cross-sectional view, greatly enlarged, of the floating variable weight counterbalance system shown in the conveyor of FIGS. 2 and 4, illustrating a preferred method of construction of the variable counterbalance weight utilizing a bicycle-type link chain.

Referring now to FIG. 14, the variable counterbalance weight 52 shown in FIGS. 2, 3 and 4 is shown in cross-section and in greater enlarged detailed. As can be seen, the individual rectangular plates 54 are respectively connected to individual links 60 of link chain 56 by bolts or screws 62. FIG. 14 also illustrates in greater detail the continuous structure of the variable counterbalance weight 52 in that the individual plates are capable of gradually shifting from the fixed frame member 74 to the floating dancer arm 48 to provide a continuous transfer of the weight between the fixed support 74 and the floating dancer arm 48 as needed by the weight of the generally V-shaped portion of excess belt 44 in the take-up section. It can be fully appreciated, particularly by FIG. 14, that the dimensions of the plates 54 and the spacing of the plates with respect to each other can be calculated and determined to provide whatever degree of precision may be required in individual circumstances to shift the weight in an appropriate manner between the dancer arm 48 and the fixed support 74. In addition, the material utilized to construct the plates, and the density of that material can also be calculated and determined to provide precision in complementing the weight of the excess belt in the take-up section. A typical preferred embodiment includes rectangular plates 54 fabricated of stainless steel.

Moreover, as noted, it can be appreciated that although a bicycle-type link chain 56 has been illustrated to connect the individual plates, any suitable connecting device which will permit the plates to articulate in pivotal fashion with respect to each other in a manner similar to that shown in the drawings is contemplated. Finally, depending upon the weight requirements in each instance, it is envisioned that the variable weight 52 can be substituted by a flexible continuous belt made of a dense heavy material, whereby the individual weights can be eliminated. For example, a flexible plastic belt having dense material such as lead pellets embedded therein may be provided.

Figure 15:
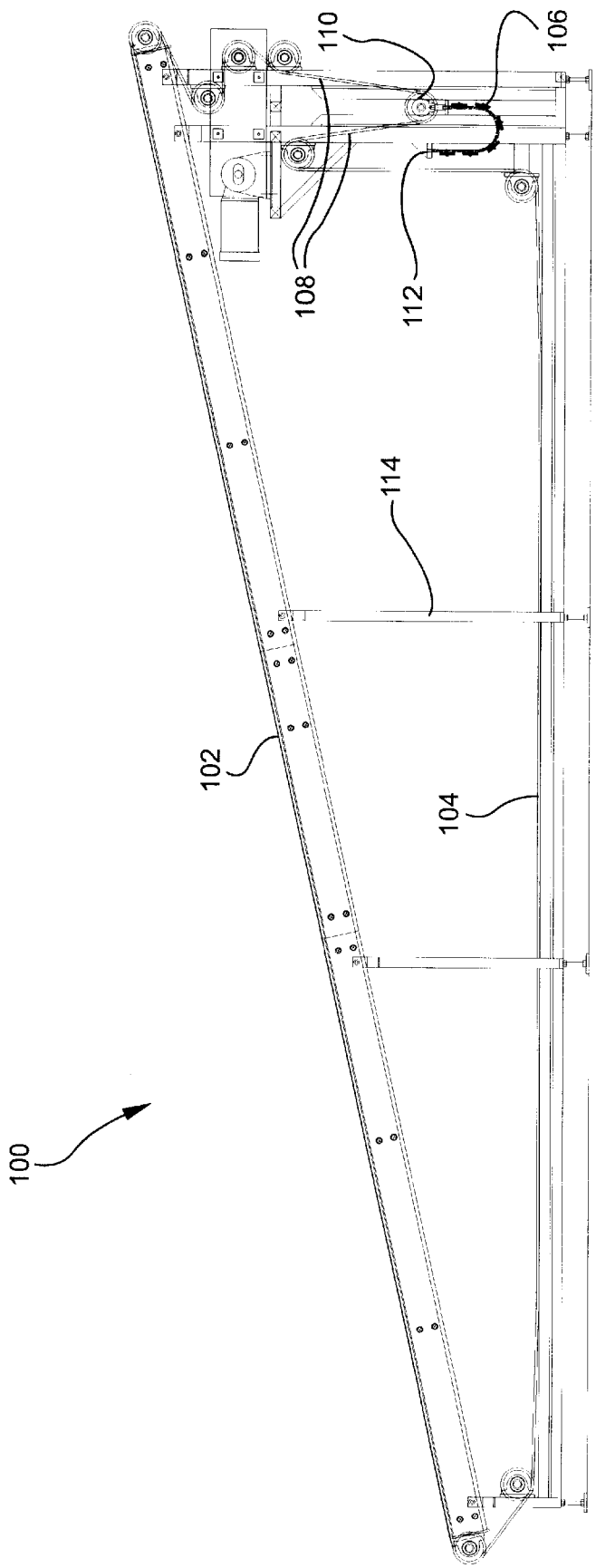
FIG. 15 is a front elevational view of a straight conveyor incorporating the variable weight counterbalance system of the present invention.

Referring now to FIG. 15, there is shown a straight conveyor 100 which includes conveyor belt 102 having a return section 104 and a variable counterbalance weight 106 connected to a generally V-shaped excess belt section 108 in the take-up section via floating dancer arm 110. The variable counterbalance weight 106 is connected at one end to the floating dancer arm 110 in the same manner as described in the previous embodiment, and at the other end to a fixed support 112 connected to frame 114 as described in the previous embodiment. Although the conveyor belt 102 shown in FIG. 15 is an endless straight conveyor belt as compared to the helical endless conveyor belt shown in the previous Figs., the operation of the belt with respect to the excess amount of belt accumulated in the tale-up section is identical to the disclosures of the previous embodiment.

What is claimed is:

1. Variable counterweighted take-up assembly for an endless conveyor system, the endless conveyor system having a frame, an endless conveyor belt supported by the frame and adapted to traverse a predetermined endless path, and a take-up section wherein excess portions of the conveyor belt are allowed to accumulate so as to permit operational fluctuations in the length of the belt, said portion of accumulated excess belt being divided into at least two adjacent sections, a first fixed section wherein the length and weight of the belt therein is substantially constant, and a second variable section wherein the length and weight of the belt therein is permitted to vary, said first and second sections being opposed to each other in counterbalance relation in a manner to affect belt tension throughout the conveyor system, said take-up section comprising an elongated flexible weighted member having at least two ends, a first end supported by said accumulated belt portion in said second variable section, and said second end supported by a fixed frame member spaced from said second variable section.

2. The variable counterweighted take-up assembly according to claim 1, wherein said elongated weighted member comprises a plurality of individual weight members connected to each other in a manner to permit pivotal articulated movement relative to each other between said second variable section and said fixed frame member so as to permit flexible movement of said weighted member between said second variable section and said fixed frame member in dependence upon variations in said accumulated portion of excess belt in said second variable section.

3. The variable counterweighted take-up assembly according to claim 2, wherein said individual weight members are generally rectangular in shape.

4. The variable counterweighted take-up assembly according to claim 3, wherein said individual weight members are connected to each other by at least one link chain to permit pivotal articulated movement relative to each other.

5. The variable counterweighted take-up assembly according to claim 4, wherein said first fixed section and second variable section are positioned within a return section of said conveyor belt wherein said conveyor belt returns from a product discharge station to a product input station while reversing belt direction.

6. The variable counterweighted take-up assembly according to claim 5, wherein said portion of conveyor belt in said first fixed section is in the form of a vertical curtain of belt having an upper and a lower end, and a roller member is positioned at each end for directing said belt along its path within said first section.

7. The variable counterweighted take-up assembly according to claim 6, wherein said second variable section is comprised of excess conveyor belt which is directed beneath and around at least a portion of a floating dancer roller so as to assume a generally V-shaped elevational configuration, whereby the weight of said generally V-shaped excess conveyor belt in said second variable section is opposed in counterbalance relation to the weight of said conveyor belt in said first fixed section, and said elongated flexible weighted member is appended to said floating dancer arm to complement the weight of said excess conveyor belt in said second variable section.

8. The variable counterweighted take-up assembly according to claim 7, wherein said floating dancer arm is permitted to move upwardly and downwardly in dependence upon the amount of excess belt in said second variable section, and said weight of said elongated flexible weighted member is permitted to transfer between said floating dancer arm and said fixed frame member in dependence upon the vertical position of said floating dancer arm as determined by the amount of excess belt in said second variable section.

9. The variable counterweighted take-up assembly according to claim 8, wherein a substantial portion of said weight of said elongated flexible weighted member is transferred to said floating dancer arm when said excess belt in said second variable section is at a minimum and said floating dancer arm is located at its uppermost vertical portion, and a substantial portion of said weight of said flexible weighted member is transferred to said fixed frame member when said weight of said excess belt in said second variable section is at a maximum and said floating dancer arm is located at its lowermost vertical position.

10. The variable counterweighted take-up assembly according to claim 9, wherein said second variable section communicates with said discharge station of said conveyor belt by a plurality of roller members.

11. The variable counterweighted take-up assembly according to claim 10, wherein said elongated flexible weighted member is comprised of a plurality of rectangular shaped steel plates flexibly connected to each other by at least two bicycle-type link chains each having at least one selected link respectively attached to each rectangular shaped steel plate by a fastener to permit said pivotal articulated movement.

12. The variable counterweighted take-up assembly according to claim 1, wherein said elongated flexible weighted member is an elongated unitary flexible weighted member.

13. Endless conveyor system having a variable counterweighted take-up assembly, which comprises:
   a) a frame;
   b) a flexible endless conveyor belt supported by said frame and adapted to traverse a predetermined endless path;
   c) a conveyor belt take-up section which permits excess portions of said conveyor belt to accumulate so as to permit operational fluctuations in the length of the belt, said accumulated belt portion being divided into at least two spaced sections, a first fixed section wherein the length and weight of the belt is substantially fixed, and a second variable section wherein the length and weight of the belt therein is permitted to vary, said first and second sections being opposed to each other in counterbalance relation in a manner to affect belt tension in the endless conveyor belt; and
   d) an elongated flexible weighted member having at least two ends, a first end appended to said second variable section, and a second end connected to a fixed frame member spaced from said second variable section.

14. The endless conveyor system according to claim 13, wherein said conveyor belt traverses a path having a product input station and a product discharge station communicating with each other by a return section, and said conveyor belt is directed from said discharge station around a plurality of roller members so as to reenter said input station.

15. The endless conveyor system according to claim 14, wherein said take-up section is located in said return section of said conveyor belt.

16. The endless conveyor system according to claim 15, wherein said elongated flexible weighted member preferably comprises a plurality of individual weight members connected to each other in a manner to permit pivotal articulated movement relative to each other between second variable section and said fixed frame member so as to permit flexible movement of said weighted member between said second variable section and said fixed frame member in dependence upon variations in said accumulated portion of excess belt in said second variable section of said take-up section.

17. The endless conveyor system according to claim 16, wherein said individual weight members are generally rectangular in shape.

18. The endless conveyor system according to claim 17, wherein said first fixed section and said second variable section are positioned within a return section of said conveyor belt wherein said conveyor belt returns from a product discharge station to a product input station while reversing belt direction.

19. The endless conveyor system according to claim 18, wherein said portion of conveyor belt in said first fixed section is in the form of a vertical curtain of belt having an upper and a lower end, and a roller member is positioned at each end for directing said belt along its path within said first section.

20. The endless conveyor system according to claim 19, wherein said second variable section is comprised of excess conveyor belt which is directed beneath and around at least a portion of a floating dancer roller so as to assume a generally V-shaped elevational configuration, such that the weight of said generally V-shaped excess conveyor belt in said second variable section is opposed in counterbalance relation to the weight of said conveyor belt in said first fixed section, and said elongated flexible weighted member is appended to said floating dancer arm to complement the weight of said excess conveyor belt in said second variable section.

21. The endless conveyor system according to claim 20, wherein said floating dancer arm is permitted to move upwardly and downwardly in dependence upon the amount of excess belt in said second variable section, and said weight of said elongated flexible weighted member is permitted to transfer between said floating dancer arm and said fixed frame member in dependence upon the vertical position of said floating dancer arm as determined by the amount of excess belt in said second variable section.

22. The endless conveyor system according to claim 21, wherein a substantial portion of said weight of said elongated flexible weighted member is transferred to said floating dancer arm when said excess belt in said second variable section is at a minimum and said floating dancer arm is located at its uppermost vertical position, and a substantial portion of said weight of said flexible weighted member is transferred to said fixed frame member when said weight of said excess belt in said second variable section is at a maximum and said floating dancer arm is located at its lowermost vertical position.

23. The endless conveyor system according to claim 22, wherein said second variable section communicates with said discharge station of said conveyor belt by a plurality of roller members.

24. The endless conveyor system according to claim 23, wherein said elongated flexible weighted member is comprised of a plurality of rectangular shaped steel plates flexibly connected by a pair of bicycle-type link chains each having at least one selected link respectively attached to each rectangular shaped steel plate by a fastener to permit said pivotal articulated movement.

25. The endless conveyor system according to claim 24, wherein said flexible conveyor belt traverses a helical path having a product input station and a product discharge station and said return section communicates said product discharge station and said product input station with each other.

26. The endless conveyor system according to claim 25, wherein said conveyor belt is adapted to travel in an upward direction along said helical path from said product input station to said product discharge station.

27. The endless conveyor system according to claim 26, wherein said conveyor belt is adapted to travel in a downward direction along said helical path from said product input station to said product discharge station.

28. The endless conveyor system according to claim 24, wherein said conveyor belt is adapted to travel along a straight path between said product input station and said product discharge station and said return section communicates said product discharge station with said product input station.

29. The endless conveyor system according to claim 28, wherein said conveyor belt is adapted to travel in either of two directions along said straight t path.

30. End less conveyor system having a variable counterweighted take-up assembly, which comprises:
 a) a frame;
 b) a flexible endless conveyor belt supported by said frame and adapted to traverse a predetermined endless path about a rotating cage, at least a portion of said endless path being helical;
 c) a conveyor belt take-up section which permits excess portions of said conveyor belt to accumulate so as to permit operational fluctuations in the length of the belt, said accumulated belt portion being divided into at least two spaced sections, a first fixed section wherein the length and weight of the belt is substantially constant, and a second variable section wherein said portion of belt therein extends at least partially about a floating dancer roller so as to assume a generally V-shaped configuration, and the length and weight of the belt therein is permitted to vary while permitting said dancer roller to move between a lowermost and an uppermost vertical position in dependence upon the amount of excess belt in said variable section, the weight of the portions of belt in said first and second sections being opposed to each other in counterbalance relation in a manner to affect belt tension in the endless conveyor belt; and
 d) an elongated flexible weighted member having at least two ends, a first end appended to said second variable section, and a second end connected to a fixed frame member spaced from said second variable section, said elongated flexible member including a plurality of weighted members connected to each other in a manner to permit flexible pivotal movement relative to each other, such that when said floating dancer roller is at its lowermost vertical position, a major portion of said weighted members move toward said fixed frame member so as to reduce the portion of said weighted members caused by said variable section, and when said floating dancer roller is at its uppermost position, a major portion of said weighted members move toward said dancer roller so as to increase the portion of said weighted members caused by said variable section.

31. A method of controlling excess portions of conveyor belt in an endless conveyor system having a frame, an endless conveyor belt adapted to traverse a helical path about a rotating cage which provides belt driving force by frictional engagement with an inner edge of said belt, a take-up section for receiving excess portions of belt caused by operational fluctuations in the length of the belt, said take-up section being divided into at least two sections, a first fixed section wherein the length and weight of the belt portion therein is substantially fixed, and a second variable section wherein the length and weight of the belt therein is permitted to vary, said first and second sections being opposed to each other in counterbalance relation in a manner to affect belt tension throughout the conveyor system, comprising selectively complementing with additional weight, the weight of said portion of belt in said second variable section in a manner to maintain the combined weight therein substantially constant, or at least to within a predetermined range.

32. The method according to claim 31, wherein said step of complementing said weight of said portion of belt in said second variable section is accomplished by supporting one end of an elongated flexible weighted member by said portion of belt in said second variable section and supporting the other end of said elongated flexible weighted member by a fixed member spaced by a predetermined distance from said second variable section, such that when the weight of said belt portion in said second variable section increases, the amount of complementary weight supported thereby decreases, and when the weight of said belt portion in said second variable section decreases, the amount of complementary weight supported thereby increases.

* * * * *

UNITED STATES PATENT AND TRADEMARK OFFICE
CERTIFICATE OF CORRECTION

PATENT NO.    : 6,394,261 B1
DATED         : May 28, 2002
INVENTOR(S)   : Ronald DeGennaro It is certified that error appears in the above-identified patent and that said Letters Patent is hereby corrected as shown below:

Column 8,
Line 48, now reads "he belt wraps"; should read -- the belt wraps --.
Line 49, now reads "ontinuous frictional"; should read -- continuous frictional --.

Column 11,
Lines 3 and 4, now reads "variable 25 counterbalance."; should read -- variable counterbalance --.

Signed and Sealed this

Nineteenth Day of November, 2002

*Attest:*

*Attesting Officer*

JAMES E. ROGAN
*Director of the United States Patent and Trademark Office*